UNITED STATES PATENT OFFICE.

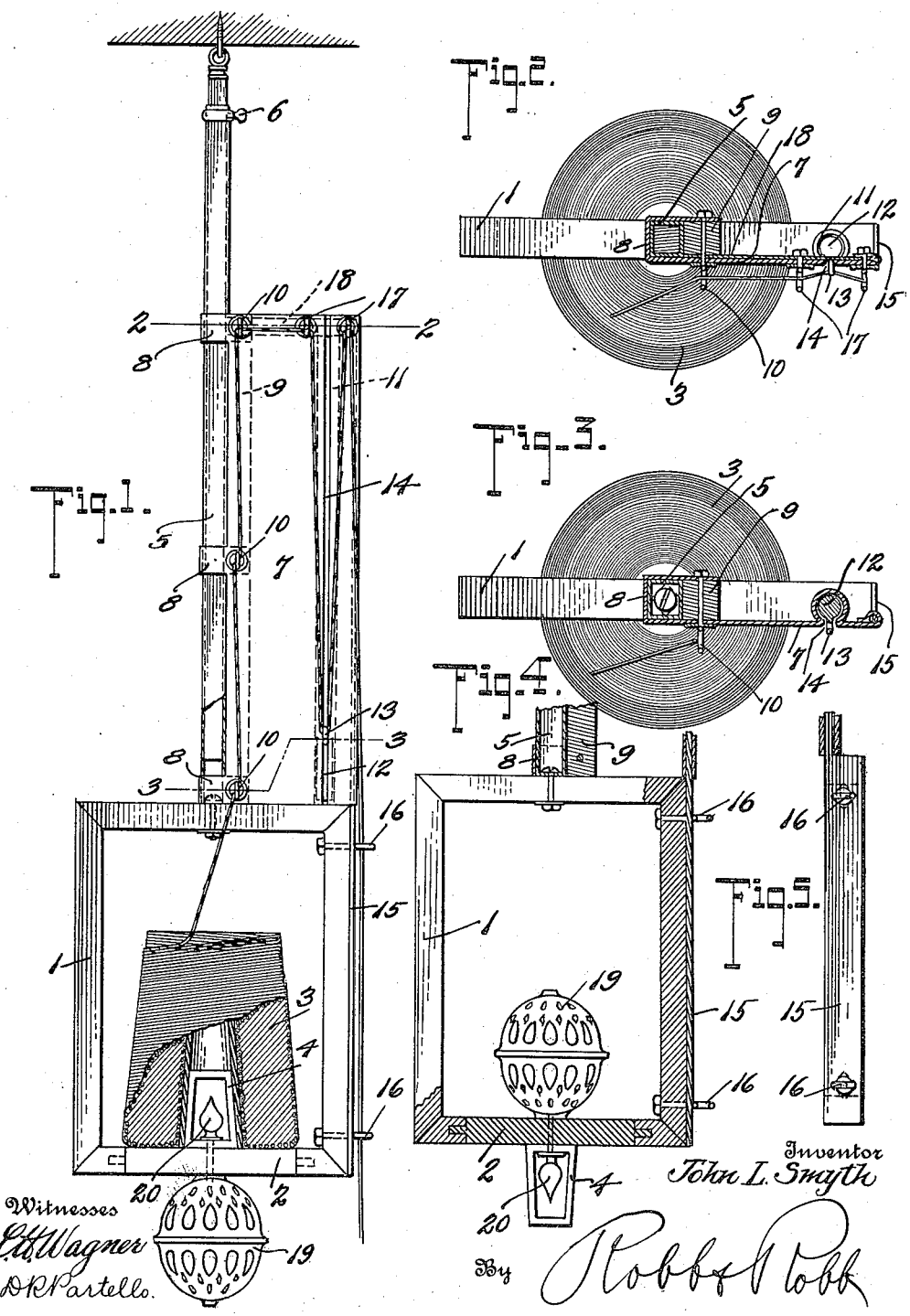

JOHN L. SMYTH, OF SAPULPA, OKLAHOMA.

TWINE-HOLDER.

1,146,601.  Specification of Letters Patent.  Patented July 13, 1915.

Application filed October 29, 1914. Serial No. 869,273.

*To all whom it may concern:*

Be it known that I, JOHN L. SMYTH, a citizen of the United States, residing at Sapulpa, in the county of Creek and State of Oklahoma, have invented certain new and useful Improvements in Twine-Holders, of which the following is a specification.

The present invention appertains to improvements in twine holders and particularly to that type wherein a movable weight is employed in coöperation with the twine for withdrawing the free end thereof into an elevated position away from the counter upon release of the same by the user after wrapping.

The essence of the invention lies in the provision of a guide plate coacting with a twine rack which serves not only to guide the weight connected to the twine but also embodies tension elements intermediate said weight and the twine ball whereby unwinding of the twine therefrom is prevented until said weight is elevated into its operative position ready to act upon the free end of said twine as soon as said end is released, stop means also coöperating with the guide plate to prevent displacement of said weight. This and such other objects, as may hereinafter appear are attained by the novel construction, combination and arrangement of parts to be hereinafter specifically described and claimed.

Reference will now be had to the accompanying drawings forming a part of this specification, wherein:

Figure 1 is a side elevation of a holder constructed in accordance with my invention parts being broken away and shown in section to bring out more clearly the details of construction. Fig. 2 is a horizontal sectional view on the line 2—2 of Fig. 1. Fig. 3 is a horizontal section taken about on the plane indicated by the line 3—3 of Fig. 1. Fig. 4 is a detailed view in elevation, with parts broken away of the frame member for holding the twine, and showing the reversibility of the twine holding member connected to the frame. Fig. 5 is an end view of the parts shown in Fig. 4.

Throughout the following detail description, and on the several figures of the drawing, similar parts are referred to by like reference characters.

Specifically describing my invention and referring to the drawing, the numeral 1 designates a frame of substantially rectangular form and on the bottom member 2 of which the twine ball 3 is disposed, being inserted over the spindle 4 as clearly shown in Fig. 1. This frame is suitably suspended from the ceiling or wall at a convenient point above the counter by means of the telescopic standard or support 5, a set screw 6 being employed to adjust the height of the frame from the floor or the counter as desired. Disposed upon the frame 1 at one side of the support 5 is the guide plate 7 which is of elongated rectangular form, of any suitable material, preferably metallic, lateral extension arms 8 being formed along one edge of said plate and bent around the support 5. Adjacent to said support is a vertical frame element 9 arranged at the back of the plate 7, a series of eye-bolts 10, vertically arranged, passing through the guide plate, the frame member 9 and the rebent extremities or arms of said side plate. As will be noted by reference to Fig. 1 these eye bolts are arranged with their openings in a plane at angles to the line or path of the twine 3 which is passed through these members and this arrangement I particularly prescribe in order to provide for a certain amount of tension to act upon the twine and prevent its too freely unwinding from the ball.

It will be noted that the plate 7 is bent near its outer edge rearwardly in order to form a tubular casing extending vertically of said plate as indicated at 11 and within this casing is movably mounted a weight 12 having an apertured lug 13 extending laterally therefrom through the slot 14 which is provided at one side of the casing 11 in the formation of said casing from the plate. As best shown in Figs. 2 and 3 the lateral edge of the plate 7 is rebent about the upper attenuated portion of a supporting strap or plate 15 secured to one side of the frame 1 by means of the eye-bolt 16 and a horizontal plate 18 is disposed at the upper end of the plate, being secured by the eye bolts 17 arranged at each side of the casing 11 and the uppermost eye-bolt 10 hereinbefore-mentioned. The plate is thus made quite rigid and it will be obvious that the upper transverse plate 18 extending as it does across the slot 14 will act as a stop member for the weight to prevent its accidental displacement from the casing by a sudden jerking of the twine in the use of the apparatus.

As will be observed from the drawing, the twine passes from the ball through the guiding and tensioning eye-bolts 10, across through the left-hand eye-bolt 17 downwardly through the apertured lug 13 of the weight, thence upwardly through the right-hand eye-bolt 17 and again downwardly along the guide plate and the frame 1 through the eye-bolts 16.

The operator reaches upwardly and grasping the free end of the twine, pulls the same into position for wrapping bundles or such other use as desired, this action causing the weight 12 to be raised in the casing to the upper end of the same and immediately the free end is released, the weight 12 will fall and withdraw the free end from the counter. The arrangement of the eye-bolts 10 as hereinbefore mentioned provides sufficient tension to prevent the twine unwrapping too freely from the ball and insuring that the weight will be raised in the casing as just described. These eye-bolts also perform the dual function of clamping the guide plate 7 to the supporting standard 5. Since it is customary to use twine either in the conical shape designated in Fig. 1 or in ball form, I preferably provide the frame 1 with a spindle 4 at one side of the lower frame member 2 and the ball container 19 secured by the common fastening member 20 at the other side of said frame member so that it is possible to reverse the positions of these holding elements depending upon the style of twine which is to be employed with the apparatus.

Having thus described my invention, what I claim as new is:

1. A twine holder comprising a frame, suspension means connected to said frame, a guide plate having lateral extensions engaging said suspension means, guide eyes coacting with said extensions to clamp the plate to the suspension means, said plate being bent longitudinally to form a vertical slotted casing, a weight disposed in said casing and having a guide member extending through the slot and to which the twine is connected, and means coöperating with the plate for preventing displacement of the weight from the casing.

2. A twine holder comprising a frame, suspension means connected to said frame, a guide plate having lateral extensions engaging said suspension means, guide eyes coacting with said extensions to clamp the plate to the suspension means, said plate being bent longitudinally to form a vertical slotted casing, a weight disposed in said casing and having a guide member extending through the slot and to which the twine is connected, a supporting strap connected to the frame and having its upper portion engaged by the guide plate aforesaid, and a horizontal stop plate secured to the upper end of the guide plate and extending across the slot to constitute a stop member for preventing displacement of the weight from its casing.

In testimony whereof I affix my signature in presence of two witnesses.

JOHN L. SMYTH.

Witnesses:
 JOHN G. ELLINGHAUSEN,
 RUTH SNYDER.

Copies of this patent may be obtained for five cents each, by addressing the "Commissioner of Patents, Washington, D. C."